United States Patent [19]

Deom et al.

[11] Patent Number: 4,833,660
[45] Date of Patent: May 23, 1989

[54] DEVICE FOR DETECTING THE PRESENCE OF FROST AND/OR FOR MEASURING THE THICKNESS OF FROST BY ULTRASOUND AND FROST PROBE USABLE IN SUCH A DEVICE

[75] Inventors: Alain Deom, Cachan; Jean-Claude Garnier, Chatillon; Didier Guffond, Fontenay Aux Roses, all of France

[73] Assignee: Office National d'Etudes et de Recherches Aerospatiales, Chatillon Sous Bagneux, France

[21] Appl. No.: 107,983

[22] Filed: Oct. 14, 1987

[30] Foreign Application Priority Data

Oct. 15, 1986 [FR] France ............................. 86 14320

[51] Int. Cl.$^4$ ............................................ H04R 17/00
[52] U.S. Cl. ................................... 367/157; 367/902; 367/908; 244/134 F; 73/617
[58] Field of Search ............... 367/157, 159, 908, 902; 73/1 J, 615, 627, 629, 597, 646, 617; 244/134 R, 134 F; 62/139, 140; 340/962; 310/336

[56] References Cited

U.S. PATENT DOCUMENTS

| | | | |
|---|---|---|---|
| 2,966,656 | 12/1960 | Bigbie et al. | 367/157 |
| 3,200,369 | 8/1965 | Neubauer et al. | 367/157 |
| 3,690,154 | 9/1972 | Wells et al. | 73/616 |
| 3,918,296 | 11/1975 | Kitada | 73/627 |
| 3,921,442 | 11/1975 | Soloway | 310/336 |
| 4,205,686 | 6/1980 | Harris et al. | 310/336 |
| 4,428,206 | 1/1984 | Massa | 62/140 |
| 4,437,332 | 3/1984 | Pittaro | 73/627 |
| 4,532,806 | 8/1985 | Bruchmüller | 62/140 |
| 4,553,137 | 11/1985 | Marxer et al. | 244/134 F |
| 4,604,612 | 8/1986 | Watkins et al. | 367/157 |

Primary Examiner—Deborah L. Kyle
Assistant Examiner—J. Woodrow Eldred
Attorney, Agent, or Firm—Larson and Taylor

[57] ABSTRACT

In a detection device of the presence of frost and/or measuring the thickness of the frost by ultrasound, a probe with a piezoelectric ultrasonic transducer generates an ultra-sonic acoustic emission wave and detects ultrasonic acoustic echo waves reflected by the frost. An actuating device for the probe is arranged to provide to the transducer electrical energizing signals. The probe comprises: a frost detector placed in front of the transducer and constituted of a material having an acoustic impedance between $30 \times 10^5$ and $44 \times 10^5$ kg m$^{-2}$s$^{-1}$. This detector has a surface designed to be exposed to the surrounding atmosphere to be covered with frost. An acoustic delay device is adapted to ensure acoustic coupling and adaptation between the transducer and the detector and to separate in time the ultrasonic emission add reflected waves. A body of heat insulating material covers the assembly of the detector, the transducer and the acoustic delay device.

16 Claims, 2 Drawing Sheets

DEVICE FOR DETECTING THE PRESENCE OF FROST AND/OR FOR MEASURING THE THICKNESS OF FROST BY ULTRASOUND AND FROST PROBE USABLE IN SUCH A DEVICE

BACKGROUND OF THE INVENTION

The present invention relates to the field of detecting the presence of frost and/or of measuring the thickness of frost by ultrasound.

At the present time magneto-striction probes and pressure probes are utilised to perform a qualitative detection of frost on the wings of an airplane. These probes have the drawback of disturbing the flow of air around the wing and of necessitating the placing in operation of movable parts, which are hence fragile, whence a diminution in the reliability of the detection systems.

In the field of measurement of the thickness of the frost layer, it is known to use optical or optoelectronic probes which have however the main drawbacks of necessitating the use of transparent walls, generally of glass and hence fragile, and especially of being limited to the measurement of small thicknesses. Hyperfrequency probes are also known which have the drawbacks of requiring complex equipment and of necessitating careful adjustments; in addition, calibration of them is delicate and, generally, they are better adapted to the detection of the presence of frost than to the measurement of its thickness. Finally, vibrating probes are known of which the disadvantage is of being fragile and of being limited to the measurement of small thicknesses of frost (typically 5mm).

In addition, it is well known to use ultrasonic vibrations to analyse materials, in particular to measure the thickness thereof, and attempts have been made to detect the presence and/or to measure the thickness of frost. However, the known devices do not provide information exploitable in real time.

In brief, none of the types of probes at present known, both of the detection of the presence of frost and for the measurement of its thickness, gives total satisfaction.

GENERAL DESCRIPTION OF THE INVENTION

It is an essential object of the invention to provide an original device employing the properties of ultrasonic vibrations, to detect the presence of frost and/or to measure its thickness, which avoids the disadvantages offered by the probes of the prior art.

To this end, according to a first aspect of the invention a detection device of the presence of frost and/or of measuring the thickness of the frost by ultrasound, comprising, on the one hand, a probe which includes an ultrasonic transducer of the piezoelectric type adapted to generate an ultrasonic emission acoustic wave and to detect ultrasonic acoustic echo waves reflected by the frost, and on the other hand, means for the actuation of the probe arrange to provide to the ultrasonic transducer electrical energizing signals in order to cause it to generate ultrasonic waves and to detect and process the electric echo signals at the output of the ultrasonic transducer, is characterized in that the probe comprises also in combination:

a frost detector placed in front of the ultrasonic transducer and constituted of a material having an acoustic impedence close to that of frost and comprised between $30 \times 10^5$ and $34 \times 10^5$ $kg.m^{-2}.s^{-1}$, said detector having a surface designed to be exposed to the surrounding atmosphere and could be covered with frost;

acoustic delay means adapted to ensure accoustic coupling and adaptation between the tranducer and the detector and to separate in time the ultrasonic emission wave and the ultrasonic reflected wave, and body of heat insulating material ensuring the assembly of the detector, of the transducer and of the acoustic delay means.

This basic structure offers the advantage of lending itself both to the production of a detection device of the presence of frost and to a measuring device of the thickness of the frost.

Under these conditions, more specifically, a detection device of the presence of frost according to the invention is characterized in that the frost detector is constituted of a material having an acoustic impedance substantially different from that of the frost and comprised between $36 \times 10^5$ and $44 \times 10^5 kg.m^{-2}.s^{-1}$.

Advantageously, the constituent material of the frost detector is bakelised cotton.

Preferably, the acoustic delay means comprise an accoustic delay element inserted between the detector and the ultrasonic transducer and having an accoustic impedance comprised between $12 \times 10^5$ and $36 \times 10^5 kg.m^{-2}.s^{-1}$, and which can, for example, be constituted by a resin filled by tungsten powder, having a specific gravity of 1.5 to 2.

It is also desirable that such a device should include heat regulation means, comprising particularly a heating element, for the inside of the probe.

In a specific embodiment, the body of the probe is tubular and the front surface or active surface of the frost dectector is convex.

In addition, a device for measuring the thickness of the frost according to the invention is characterized in that the frost detector is constituted by a material having an acoustic impedance as close as possible to that of the frost and comprised between $30 \times 10^5$ and $34 \times 10^5$ $kg.m^{-2}.s^{-1}$, in that the front surface or active surface of the frost detector is convex, and in that there are provided heat regulating means, including particularly a heating element for the inside of the probe.

Advantageously, the constituent material of the frost detector is of methyl polymethacrylate (for example Altuglass) or the like.

Preferably, the acoustic delay means are constituted by the thickness of the constituent material of the frost detector.

Similarly for both types of device, it is possible to provide for the frost detector to be constructed in the form of a part fixable removably, particularly screwable, to the body.

It is, in addition, advantageous for abovesaid actuating means of the probe to comprise a variable gain amplifier controlled by a signal with progressive amplitude variation, such as a ramp, at the moment of emission of the ultrasonic signal, so that an automatic compensation of the weakening of the ultrasound is procured according to the thickness of the frost and so that an electrical output signal is collected having an approximately constant amplitude whatever the thickness of the frost.

The device arranged according to the invention does not show any of the drawbacks of the prior art devices mentioned above. More particularly, the device arranged for the detection of the presence of frost is equiped with a detector of simple design, hence of little fragility and reliable; its response time is not large (typically of the order of 15 s for a frost deposit of thickness 0.1 mm); it is possible to provide an automatic test sequence of good operation, even in the absence of frost. On the other hand, the device arranged for the measurement of the thickness of the frost has the same advantage resulting from the simplicity of the detector; it is suitable for measuring frost thicknesses within a range (typically from some tenths of a millimeter to several centimeters) greater than the amplitude of measurement permitted by the majority of known apparatus, the accuracy of the measurements which is a function of the crystalline nature of the ice and of its state, maybe some tenths of a millimeter; it is also possible to carry out an automatic test of sound operation, even in the absence of frost.

Although the field of use of the device according to the invention is quite extensive, a particularly interesting application resides in the detection of the presence of frost and/or in the measurement of the thickness of the frost on an airplane wing or the like (particularly a wing leading edge or an aircraft profile), the probe then being located in a hollow housing in said surface, the front surface of the frost detector being flush with the surface concerned. Besides the above-mentioned advantages connected with the structure of the device an additional advantage resides in the fact that this arrangement reduces to the minimum the disturbance of the airflow around the wing or of the profile, contrary to what occurs with other types of known probes.

Another use which seems particlarly interesting resides in an indication of the presence of glazed frost on a road or the like, the probe then being placed at the end of a rotating arm above the road.

According to a second aspect of the invention there is provided a frost probe, useful particularly in a device such as indicated above, which is characterized in that it comprises in combination:

a frost detector placed in front of the ultrasonic transducer and constituted of a material having an acoustic impedance close to that of the frost and comprised between $30 \times 10^5$ and $34 \times 10^5$ kg.m$^{-2}$.s$^{-1}$, said detector having a surface designed to be exposed to the surrounding atmosphere to be possibly covered with frost;

an ultrasound transducer of the piezoelectric type arranged behind said detector and adapted to generate an ultrasonic acoustic emission wave and to detect ultrasonic acoustic echo waves reflected by the frost, acoustic delay means adapted to ensure acoustic coupling and adaptation between the tranducer and the detector and to separate in time the ultrasonic emission wave and the ultrasonic reflective wave, and a body of a heat insulating material ensuring the assembly of the detector, of the transducer and of the acoustic delay means.

The invention will be better understood on reading the detailed description which follows of certain preferred embodiments given purely by way of non limiting example.

BRIEF DESCRIPTION OF THE DRAWINGS

In this description, reference is made to the accompanying drawings in which.

DESCRIPTION OF PREFERED EMBODIMENTS

Figure 1:
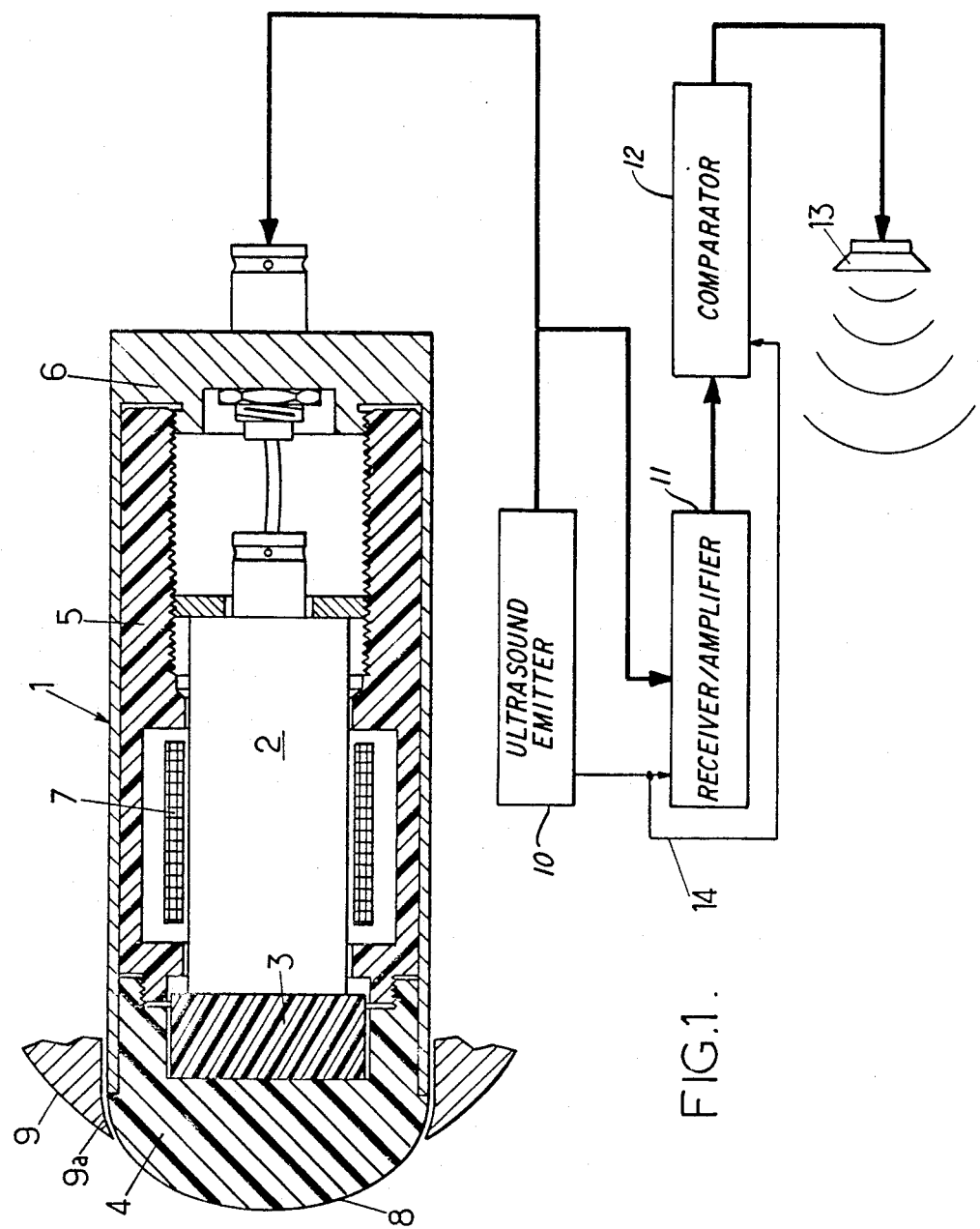
FIG. 1 is a diagram showing a simpified arrangement for a detection device of the presence of ice according to the invention, the probe of this device being shown in side view in diametric longitudinal section and the remainder of the device being shown in the form of a synoptic block diagram.
Figure 2:
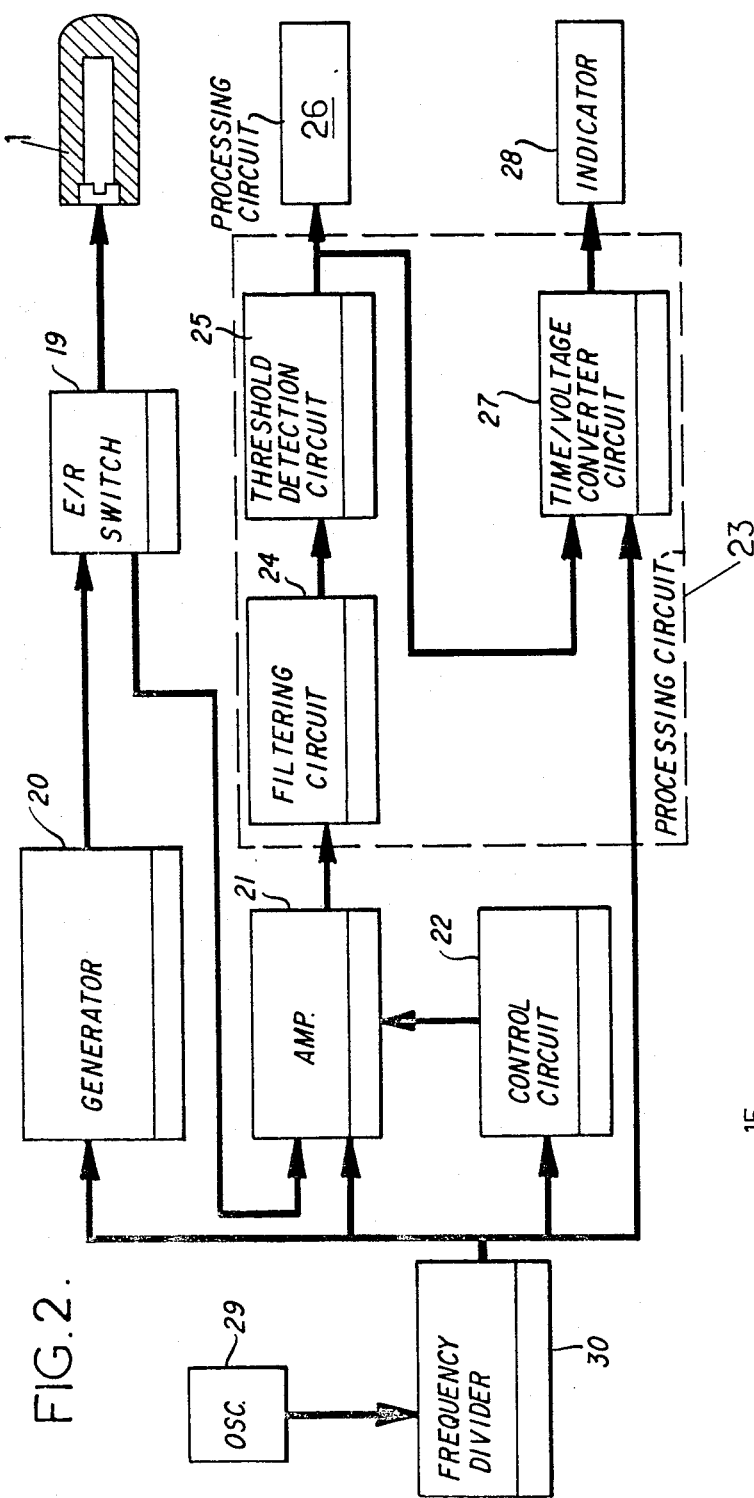
FIG. 2 is a synoptic block diagram which is more detailed than that of FIG. 1 and showing a measuring device of the thickness of the frost according to the invention, the probe being identical with that of FIG. 1 and being shown in simplified manner.

Refering to FIG. 1, there will first be described the structure of the ultrasonic probe arranged according to the invention and which can be included both in a detection device of the presence of frost (FIG. 1) and in a measuring device of the thickness of the frost (FIG. 2).

In brief, the frost probe 1 is constituted of the following elements:

an ultrasound transducer 2 designed to generate the ultrasonic acoustic emission wave, then to detect the acoustic echos created on the outer surface of the detection material or of the frost;

an acoustic delay element 3 which effects acoustic adaptation between the transducer 2 and the detection material and which separates in time the energization wave of the transducer 2 from the return wave (characterizing the damping time of the transducer)

a frost detector 4, which must possess an acoustic impedance close to that of the frost; and a body 5 which serves as a connecting element for the different constituent parts of the probe and which is machined in a heat insulating material.

A housing 6 surrounds the hole and ensures its mechanical protection.

More specifically, the various members enumerated above are constituted in the following manner.

The ultrasound transducer 2 is of the piezoelectric type. Typically it is possible to use a transducer having a central frequency of 2.25 MHz such as that marketed under the reference V 106 by the American company Panametrics. The acoustic delay element 3 inserted between the transducer and the detector 4 is constituted in two different ways according as the probe is used for the detection of the presence of frost or for the measurment of the thickness of the frost.

In the case of detection of the presence of frost, the delay element is formed of a material having an acoustic impedance comprised between that of the transducer 2 and that of the detector 4, that is to say comprised between $12 \times 10^6$ and $36 \times 10^5$ kg.m$^{-2}$ s$^{-1}$.

Such a material may be for example a resin (such as that marketed under the mark Araldite) filled with tungsten powder, having a specific gravity of 1.5 to 2. The thickness of material is of the order of 1 to 2 cm. In the case of measurement of the thickness of the frost the delay element forms an integral part of the detector 4, and, in this case, the detector 4 is shaped to occupy the position of the part 3 in the probe shown in FIG. 1.

The detector 4, which is screwed, for example, to the front end of the body of the probe 5, is constituted itself also of two different materials according to the use anticipated for the probe.

In the case of detection of the presence of frost, the detector 4 is constituted of a material having an acoustic impedance appreciably different from that of the frost and comprised between $36 \times 10^5$ and $44 \times 10^5$ kg.m$^{-2}$.s$^{-1}$. Typically, a material is used named "bakelised cotton" having an acoustic impedance of about $37 \times 10^5$ kg.m$^{-2}$.s$^{-1}$, but the use of any other material having similar or identical acoustic properties is possible.

In the case of a measurement of thickness of the frost, the detector 4 is constituted of a material having an acoustic impedance of as close as possible to that of the frost and comprised between $30 \times 10^5$ and $34 \times 10^5$ kg.m$^{-2}$.s$^{-1}$. Typically, methyl polymethacrylate is used (for example Altuglass of the Altulor company) having an acoustic impedance of $32 \times 10^5$ kg.m$^{-2}$.s$^{-1}$ The acoustic delay indicated above is then produced by the minimum thickness of the detector which is here typically of the order of 2 to 3 cm.

The insulating body 5 is preferably machined in a plastics material ensuring the internal heat insulation of the probe, the ability to withstand heat stresses which the detector will be subjected (mechanical shrinkage, cracking, . . . ), the good mechanical strength of the assembly (protection against deformation, shock, . . . ), facility of molding and/or machining of its various parts (screw threads, dimensional accuracy). Typically, it is possible to use a plastics to use a plastics material known under the name ABS or the like.

Finally the housing 6 forms the interface of fixation of the probe on its support and serves as a mechanical protection for the constituent elements of the probe. It can also ensure the mechanical connection of assembly between the detector 4 and the insulating body 3, particularly by screwing or by force fitting.

In addition, to avoid or attenuate the sensitivity of the probe to the variations of ambient temperature, it may advantageously be provided to equip it with heat - regulating means of its internal space. Such means comprise particularly a temperature detector (not visible in FIG. 1) providing electrical data varying with the temperature and heating elements 7, for example, placed around the ultrasonic transducer 2.

It will be noticed, in addition, that the front surface or active surface (detection surface of the frost) 8 of the detector 4 is convex, advantageously hemispherical or substantially hemispherical when the body of the probe is tubular, so as to ensure the formation of a layer of frost of substantially constant thickness over the whole surface exposed; in this way the formation of interfering ultrasonic echos resulting from variations of thickness of frost layer and/or of roughnesses present on this layer are avoided.

Still with reference to FIG. 1, there will now be described the simplified structure of a detection device of the presence of frost on a wall 9 (for example the leading edge of an airplane wing), this device employing the probe 1 which has just been described.

It will be noted firstly, that in the example taken into consideration, the probe 1 is installed in a housing 9a hollowed in the wall 9, so that there is only exposed to the surrounding atmosphere the active surface 8 of the probe, this active surface being flush with the surface of the wall 9 and ensuring the substantial continuity of the profile of this wall, which reduces to the minimum disturbances of aerodynamic flow around the wall 9.

The probe 1 is connected, on the one hand, to an ultrasound emitter 10 designed to energize the transducer 2 in the course of the emission phase of an ultrasonic signal and, on the other hand, to a receiver/amplifier 11 designed to shape and to amplify the electrical signals corresponding to the ultrasonic echos collected by the transducer 2 in the course of the receiving phase, these signals then being selected by comparison with a preset threshold, in a comparator 12 whose output controls a suitable signalling device 13 (shown symbolically in FIG. 1 by a sound alarm). Suitable connections 14 ensure the synchronization of the operation of the different circuits, particularly to differentiate the emission and reception phases.

Generally, these circuits are constituted by an electronic system of little complexity which detects the variations in amplitude of the echo collected by the probe in the course of the receiving phase. This detection give information on the presence of frost by comparison with the amplitude of the "empty" collected signal, that is to say corresponding to the echo produced by the surface of the detector free from any layer of frost.

An important advantage resulting from this construction resides in the permanent existence of an ultrasonic echo generated by the active surface 8 of the detector, which gives an indication on the sound operation of the probe independently of the presence or absence of frost.

On account of its small size, the probe can be easily placed in a spot where frost formation is favored (for example the leading edge of an airplane wing) in order to improve the response time of the detection device.

Figure 3:
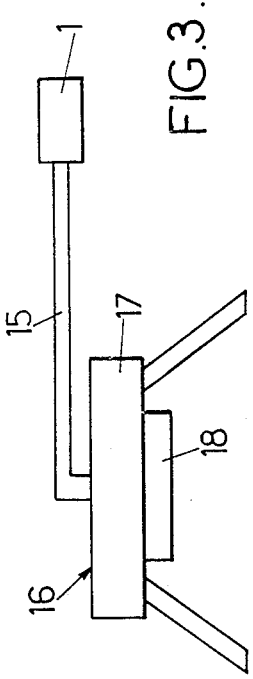
FIG. 3 is a simplified diagram showing the mounting of a probe of a device according to the invention for the detection of glazed frost on a road.

Such a detection device can also be used to detect or indicate the presence of glazed frost, for example, on a road. As shown in FIG. 3, the probe 1 is fixed to the end of an arm 15 (having, for example, a length of 0.5m), turning or oscillating with respect to a support 16 enclosing the drive motor 17 and the electronic control system 18 of the probe. With this assembly, the probe makes use of by a relative motion with respect to the frost-depositing fog; the thickness of any ice deposited on the probe 2 being 100 times to 1000 times greater than that on a motionless horizontal surface such as an adjacent road.

The placing in operation of this apparatus for detecting ice formation does not require any measurement of the meteorological parameters conditioning the appearance of glazed frost. In addition, the response of the probe being very rapid, detection of glazed frost on the probe is possible before the any appreciable thickness of the latter is present on the road. In addition, the amplification of the phenomenon of ice on probe 1 procured by the mobility of the probe enables easy judgement of the severity of the frosting on the probe and hence on the road as well as the speed of fromation of the glazed frost on the probe and hence on the road. Finally, an alarm system or defrosting system coupled with the device may only be triggered if the thickness of the ice formed and detected on the probe is relatively great: the system can hence differentiate glazed frost from white frost (which, being caused by condensation, is not amplified by the movement of the probe).

Referring to FIG. 2, there will now be described in more detailed manner than with reference to FIG. 1, the general construction of a device according to the invention enabling measurement of the thickness of the ice layer formed on the surface 8 of the detector of the probe to be carried out and hence the formation of frost to be detected. In the presence of frost, no ultrasonic echo exists due to the frost/detector interface by reason of the substantial equality of the acoustic impedances of the frost and of the constituent material of the detector. On the other hand, an echo is collected generated by the frost/air interface. The electronic system associated with the probe converts the time translation of this echo into a measure of thickness of frost (according to a predetermined relationship of the timevoltage correspondence, for example), the speed of propagation of the ultrasound signal being known moreover.

Probe 1, arranged as explained above for the measurement of the thickness of the frost, is connected, through an emission - reception switch 19, on the one hand, to the output of generator 20 of electrical pulses at the ultrasonic frequency required and to the input of a variable gain amplifier 21 whose gain is controlled by the triggering of a progressively variable signal, such as a ramp generated by a circuit 22, at the moment of emission of the ultra sound signal. This assembly enables compensation of the fact that the echo is all the more delayed and weakened as the thickness of the frost is greater and this automatic compensation enables the collection at the output of the amplifier 21 of a signal having always substantially the same amplitude, compatible with a single threshold which will be considered below.

The output of the amplifier 21 is connected to a processing circuit 23 of the signal supplying the indications sought concerning the appearance of the frost and the thickness of the frost layer.

The circuit 23 can include, as shown in FIG. 2, a filtering circuit 24, followed by a threshold detection circuit 25 with a single threshold as indicated above, whose output signal is processed on the one hand, by a circuit 26 to provide indications relative to the detection of frost-forming conditions and, on the other hand, by a circuit 27 performing a time/voltage conversion whose output signal is used at 28 to provide indication of the thickness of the frost layer.

This assembly is synchronized from a synchronising circuit comprising an oscillator 29 and a frequency divider 30 connected to the generator 20, to the amplifier 21, to the control circuit 22 of the latter and to the time/voltage converter 27.

Of course, it amounts here only to one embodiment of the electronic circuit associated with the probe 1, and it is possible to conceive this control in other forms, in particular by using a correlator of the mini computer type to effect the functions ensured by the circuit 23.

Relative to devices already known, the ultrasonic probe device arranged according to the invention procures important advantages residing: In the separation of the functions of detection of frost and the measurement of the thickness of the frost; in the response rapidity; in the structural simplicity of the probe which is free from moveable members and which, by means of a minor adaptation of the detector, is capable of being incorporated in supports of any shapes; in its limited size associated with the size of the transducer (typically diameter 20 mm and length 50 mm) for the thickness measuring probe and further reduceable for the probe for detecting the presence of frost. In addition, the electronic system associated with the probe is of little complexity and the cost of the whole is reduced.

As is self-evident and as emerges besides already from the foregoing, the invention is in no way limited to those of its types of application and embodiments which have been more especially envisaged; it encompasses, on the contrary, all modifications.

We claim:

1. A device for detecting the presence of frost by ultrasound, comprising:
    a probe including an ultrasonic transducer of the piezoelectric type adapted to generate an ultrasonic acoustic emission wave and to detect ultrasonic acoustic echo waves reflected by the frost;
    an actuating means for said probe arranged to provide to said ultrasonic transducer electrical energizing signals in order to cause said ultrasonic transducer to generate ultrasonic waves and then to detect and process the electrical echo signals at an output of said ultrasonic transducer; and
    wherein said probe comprises, in addition, in combination:
    (a) a frost detector placed in front of said ultrasonic transducer and constituted of a Bakelite cotton material having an acoustic impedance substantially different from that of the frost and comprised between $36 \times 10^5$ and $44 \times 10^5$ kg/m$^2$s, said frost detector having a front surface designed to be exposed to the surrounding atmosphere and hence subject to being covered with frost;
    (b) an acoustic delay means adapted to ensure acoustic coupling and adaptation between said ultrasonic transducer and said frost detector and to separate in time the ultrasonic emission wave and the ultrasonic reflected wave, said acoustic delay means comprising an acoustic delay element which is inserted between said frost detector and said ultrasonic transducer which has an acoustic impedance comprised between $12 \times 10^6$ and $36 \times 10^6$ kg/m$^2$s, and which is made of a resin filled with a tungsten powder having a specific gravity of about 1.5–2; and
    (c) A body of heat insulating material covering an assembly of said detector, said transducer, and said acoustic delay means.

2. A device for detecting the presence of frost according to claim 1, which further comprises a heat-regulating means, including particularly a heating element, for regulating an inside of said probe.

3. A device for detecting the presence of frost according to claim 1, wherein said front surface of said frost detector is convex.

4. A device for detecting the presence of frost according to claim 1, and further including a screw means for screwably fixing said frost detector removably to said body.

5. A device for detecting the presence of frost according to claim 1, wherein said actuating means for actuating the probe comprises a variable gain amplifier actuated by a signal of progressive amplitude variation at the moment of emission of the ultrasonic signal, so that there is procured automatic compensation of the weakening of the ultrasonic echo signal according to the thickness of the frost and an electrical output signal is collected having an amplitude approximately constant whatever the thickness of the frost.

6. A system for detecting the presence of frost on an exposed surface of a structure, said system comprising a device according to claim 1 and a housing hollowed in the structure in which said probe is implanted, said housing being configured such that said front surface of said frost detector is flush with the exposed surface.

7. A system for detecting the presence of frost on an exposed surface as claimed in claim 6 wherein said exposed surface is a leading edge of an airplane wing.

8. A system for indicating by ultrasound the presence of glazed frost on a surface, wherein said system comprises a device according to claim 1 and a movable arm, and wherein said probe is arranged at an end of said moveable arm.

9. A device for detecting the presence of frost according to claim 1, wherein said acoustic delay element has an acoustic impedance comprised between $12 \times 10^6$ kg/m²s and $32 \times 10^6$ kg/m²s.

10. A device for measuring the thickness of frost by ultrasound comprising:

a probe including an ultrasonic transducer of the piezoelectric type adapted to generate an ultrasonic acoustic emission wave and to detect ultrasonic acoustic echo waves reflected by the frost;

an actuating means for said probe arranged to provide to said ultrasonic transducer electrical energizing signals in order to cause said ultrasonic transducer to generate ultrasonic waves and then to detect and process the electrical echo signals at an output of said ultrasonic transducer; and wherein the probe comprises, in addition, in combination:

(a) a frost detector placed in front of said ultrasonic transducer and constituted of a methyl polymethacrylate material having an acoustic impedance as close as possible to that of the frost and comprised between $30 \times 10^5$ and $34 \times 10^5$ kg/m²s, said frost detector having a front surface designed to be exposed to the surrounding atmosphere and hence subject to being covered with frost, said material constituting said detector having a thickness providing acoustic delay so as to ensure acoustic coupling and adaptation between said ultrasonic transducer and said frost detector and to separate in time the ultrasonic emission wave and the ultrasonic reflected wave; and (b) a body of heat insulating material covering an assembly of said detector and said transducer.

11. A device for measuring the thickness of frost according to claim 10, which further comprises a heat-regulating means, including particularly a heating element, for regulating an inside of said probe.

12. A device for measuring the thickness of frost according to claim 10, wherein said front surface of said frost detector is convex.

13. A device for measuring thickness of frost by ultrasound according to claim 10, and further including a screw means for screwably fixing said frost detector removably to said body.

14. A device for measuring the thickness of frost by ultrasound according to claim 10, wherein said actuating means for actuating said probe comprises a variable gain amplifier actuated by a signal of progressive amplitude variation at the moment of emission of the ultrasonic signal, so that there is procured automatic compensation of the weakening of the ultrasonic echo signal according to the thickness of the frost and an electrical output signal is collected having an amplitude approximately constant whatever the thickness of the frost.

15. A system for measuring the thickness of frost by ultrasound on an exposed surface of a structure, said system comprising a device according to claim 10 and a housing hollowed in the structure in which said probe is implanted, said housing being configured such that said front surface of said frost detector is flush with the exposed surface.

16. A system for detecting the presence of frost on an exposed surface as claimed in claim 15 wherein said exposed surface is a leading edge of an airplane wing.

* * * * *